United States Patent
Götz et al.

(10) Patent No.: US 10,981,461 B2
(45) Date of Patent: Apr. 20, 2021

(54) METHOD AND DEVICE FOR ELECTRICALLY CHARGING ELECTRIC VEHICLES

(71) Applicant: Dr. Ing. h.c. F. Porsche Aktiengesellschaft, Stuttgart (DE)

(72) Inventors: Stefan Götz, Forstern (DE); Manuel Groß, Hessigheim (DE); Michael Kiefer, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 183 days.

(21) Appl. No.: 16/029,968

(22) Filed: Jul. 9, 2018

(65) Prior Publication Data
US 2019/0016223 A1 Jan. 17, 2019

(30) Foreign Application Priority Data
Jul. 12, 2017 (DE) .......................... 102017115642.9

(51) Int. Cl.
| | | |
|---|---|---|
| *B60L 53/302* | (2019.01) | |
| *B60L 53/31* | (2019.01) | |
| *H02J 7/00* | (2006.01) | |
| *F25D 17/02* | (2006.01) | |
| *B60L 11/18* | (2006.01) | |

(52) U.S. Cl.
CPC ......... *B60L 53/302* (2019.02); *B60L 11/1825* (2013.01); *B60L 53/31* (2019.02); *F25D 17/02* (2013.01); *H02J 7/0027* (2013.01); *Y02T 10/70* (2013.01)

(58) Field of Classification Search
CPC ........ B60L 53/30; B60L 53/31; B60L 53/302; F25D 17/02; H02J 7/0027; H02J 7/00309; Y02T 10/7075; Y02T 10/7088; Y02T 10/092
See application file for complete search history.

(56) References Cited

U.S. PATENT DOCUMENTS

| | | |
|---|---|---|
| 5,341,083 A | 8/1994 | Klontz et al. |
| 6,362,594 B2 | 3/2002 | Kajiura |
| 9,061,597 B2 | 6/2015 | Oda et al. |
| 2001/0003416 A1 | 6/2001 | Kajiura |
| 2009/0000328 A1 | 1/2009 | Scherer et al. |

(Continued)

FOREIGN PATENT DOCUMENTS

| | | |
|---|---|---|
| CN | 106849228 A | 6/2017 |
| DE | 102012011606 A1 | 12/2013 |

(Continued)

OTHER PUBLICATIONS

German Search Report for German Application No. 10 2017 115 642.9, with partial translation, dated Mar. 15, 2018—6 pages.

(Continued)

*Primary Examiner* — Eric S Ruppert
*Assistant Examiner* — Hans R Weiland
(74) *Attorney, Agent, or Firm* — RatnerPrestia

(57) ABSTRACT

A method and device or electrically charging electric vehicles, wherein a cooling unit makes available a cooling medium, wherein the cooling unit is designed to cool, with the cooling medium, at least two electric charging devices and at least two power electronics apparatuses which are designed to electrically charge electric vehicles.

17 Claims, 3 Drawing Sheets

(56) References Cited

U.S. PATENT DOCUMENTS

| | | | |
|---|---|---|---|
| 2009/0256523 A1* | 10/2009 | Taguchi | B60L 53/302 320/109 |
| 2010/0072946 A1 | 3/2010 | Sugano | |
| 2011/0074350 A1* | 3/2011 | Kocher | B60L 53/30 320/109 |
| 2013/0029193 A1* | 1/2013 | Dyer | B60L 53/302 429/62 |
| 2013/0069588 A1 | 3/2013 | Oda et al. | |
| 2013/0069592 A1* | 3/2013 | Bouman | B60L 53/30 320/109 |
| 2013/0175987 A1 | 7/2013 | Amma et al. | |
| 2013/0298588 A1 | 11/2013 | Jojima | |
| 2014/0084859 A1 | 3/2014 | Hall et al. | |
| 2014/0148965 A1* | 5/2014 | Epstein | B60L 53/31 700/297 |
| 2014/0292260 A1* | 10/2014 | Dyer | B60L 53/31 320/107 |
| 2015/0054460 A1* | 2/2015 | Epstein | B60L 11/187 320/109 |
| 2015/0217654 A1* | 8/2015 | Woo | B60L 53/18 320/109 |
| 2015/0327405 A1 | 11/2015 | Niizuma | |
| 2016/0270257 A1* | 9/2016 | Mark | H01R 9/11 |
| 2017/0274778 A1* | 9/2017 | van Boheemen | B60L 53/302 |
| 2018/0229616 A1* | 8/2018 | Rhodes | B60L 53/14 |
| 2018/0297477 A1* | 10/2018 | Stanfield | H02J 7/0027 |

FOREIGN PATENT DOCUMENTS

| | | |
|---|---|---|
| DE | 112014000735 T5 | 10/2015 |
| JP | 2012222214 A | 11/2012 |
| JP | 2013070479 A | 4/2013 |
| JP | 5386348 B2 | 1/2014 |
| JP | 2016220339 A | 12/2016 |
| RU | 2403187 C2 | 11/2010 |
| RU | 124742 U1 | 2/2013 |
| RU | 2481755 C2 | 5/2013 |
| RU | 2520616 C1 | 6/2014 |

OTHER PUBLICATIONS

Japanese Notification of Reason for Rejection for Japanese Application No. 2018-131987, dated Jun. 5, 2019, 2 pages.
Australian Examination Report for Australian Application No. 2018204415, dated May 28, 2019, 5 pages.
Japanese Notification of Reason for Rejection for Japanese Application No. 2018-131987, dated Feb. 28, 2020, 3 pages. 2020.
Indian Examination Report for Indian Application No. 201814021530, dated May 13, 2020, with translation, 6 pages.

* cited by examiner

METHOD AND DEVICE FOR ELECTRICALLY CHARGING ELECTRIC VEHICLES

CROSS-REFERENCE TO RELATED APPLICATION

This application claims priority to German Patent Application No. DE 10 2017 115 642.9, filed Jul. 12, 2017, which is incorporated by reference herein in its entirety.

FIELD OF THE INVENTION

The invention relates to a device for electrically charging electric vehicles and to a method for cooling charging pillars and the associated power electronics. In this context, the components which are to be temperature-controlled are respectively adjacent to one another.

BACKGROUND OF THE INVENTION

U.S. Pat. No. 9,061,597 B2, which is incorporated by reference herein, discloses a high-speed charging device and high-speed charging system for electric vehicles as well as a method for cooling the interior of the housing of a high-speed charging stand. In this case, the power supply and the control device are accommodated as a control unit in the housing.

U.S. Pat. No. 6,362,594 B2, which is incorporated by reference herein, discloses a contectless induction charging device with a stand and a power source device which is arranged on the stand and has a housing.

A blower is used for cooling in each housing.

SUMMARY OF THE INVENTION

It is desirable to make available a device for cooling a plurality of charging pillars which is improved in comparison with the above.

This is achieved by means of the device and the method as claimed in the independent claims.

With respect to the device for electrically charging electric vehicles, there is provision that a cooling unit makes available a cooling medium, wherein the cooling unit is designed to cool, with the cooling medium, at least two electric charging devices and at least two power electronics apparatuses which are designed to electrically charge electric vehicles. This permits more economical cooling since the system costs and service costs are reduced. In addition, the (ecological) burden on the environment is lower as a result of a lower level of construction. The efficiency is additionally increased by a more efficient cooling facility.

A first cooling medium line advantageously connects on the inflow side the cooling unit and a first heat exchanger in a first charging device of the at least two charging devices, wherein a second cooling medium line connects on the inflow side the cooling unit and a second heat exchanger in a second charging device of the at least two charging devices. The two charging devices are therefore connected directly to the cooling apparatus.

A first power electronics apparatus of the at least two power electronics apparatuses or the first charging device of the at least two charging devices and a second power electronics apparatus of the at least two power electronics apparatuses for the second charging device of the at least two charging devices are advantageously arranged in a first housing. This reduces the use of material for the housing.

A third cooling medium line advantageously connects a first return line of the first heat exchanger to a first inflow of the third heat exchanger in the first power electronics apparatus, wherein a fourth cooling medium line connects a second return line of the second heat exchanger to a second inflow of the fourth heat exchanger in the second power electronics apparatus. The power electronics apparatuses are thus cooled by the cooling medium, via a return line from the charging devices.

A fifth cooling medium line advantageously connects on the return flow side the third heat exchanger and the fourth heat exchanger to the cooling unit. This reduces the use of material for the cooling medium lines.

The third cooling medium line and the fourth cooling medium line advantageously lead one into the other and connect the first inflow to the second it flow. This reduces the use of material for the cooling medium lines.

The first cooling medium line and the second cooling medium line advantageously lead into a common feed line section for the cooling apparatus. This reduces the use of material for the cooling medium lines.

The first power electronics apparatus and the second power electronics apparatus are advantageously arranged in a housing, wherein the first cooling medium line and the second cooling medium line can be connected to the common cooling medium feed line on the housing. As a result, power electronics apparatuses and charging devices can be fabricated as systems in pairs together with the cooling medium lines. Connections for the cooling apparatus can be arranged on the housings.

The cooling unit is advantageously arranged at a distance of a maximum 19 meters from each of the at least two charging devices. This is a particularly favorable arrangement.

A plurality of power electronics apparatuses of the at least two power electronics apparatuses are advantageously arranged in pairs in a plurality of housings, wherein adjacent housings are arranged at a distance of 3 meters to 7 meters, preferably 5 meters, from one another, wherein a distance between each of the charging devices and the cooling unit is at maximum 19 meters. As a result, the device can be operated particularly efficiently.

A plurality of power electronics apparatuses of the at least two power electronics apparatuses are advantageously arranged in pairs in a plurality of housings, wherein adjacent housings are arranged at a distance of 3 meters to 7 meters, preferably 5 meters, from one another, wherein the distance between each housing and the charging device which is connected to this housing is greater than 300 meters, or wherein adjacent housings are arranged at a distance of 20 to 30 meters, preferably 25 meters, from one another, wherein the distance between each housing and the charging device which is connected to this housing is 7 meters to 13 meters, preferably 10 meters. As a result, the device ran be operated particularly efficiently.

The cooling unit, the cooling medium lines and the heat exchangers are advantageously designed to make available a throughflow rate of the cooling medium of 100 liters per minute given a maximum pressure loss of 4 bar in the device. This improves the efficiency of the system.

With respect to the method for cooling there is provision that a cooling unit makes available a cooling medium, wherein the cooling unit cools, with the cooling medium, at least two electric charging devices and at least two power electronics apparatuses which are designed to electrically charge electric vehicles.

BRIEF DESCRIPTION OF THE DRAWING

Further advantageous refinements are apparent from the following description and the drawing. In the drawing.

DETAILED DESCRIPTION OF THE INVENTION

Figure 1:
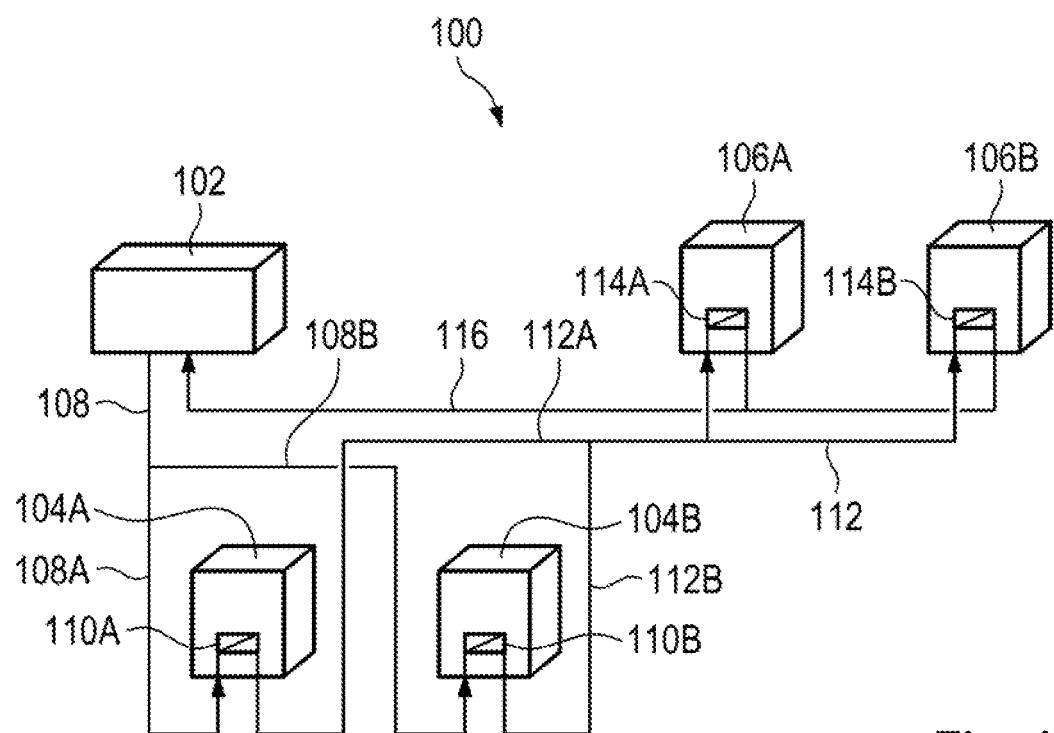
FIG. 1 shows schematically a cooling system for two charging pillars for electric vehicles.

FIG. 1 shows schematically a device 100 for charging electric vehicles. The device 100 comprises a cooling unit 102 which makes available a cooling medium. The cooling medium is, for example, water or some other medium which can be used, for example, in or for a district heating system. The cooling unit 102 can preferably be connected to a district heating apparatus, via which heat can be discharged by means of the cooling medium.

The cooling unit 102 is designed to cool at least two electric charging devices 104A, 104B and at least two power electronics apparatuses 106A, 106B. Each of the power electronics apparatuses 106A, 106B is designed to supply current to at least two electric charging devices 104A, 104B for electrically charging electric vehicles. The at least two charging devices 104A, 104B are, for example, charging pillars for electric vehicles.

A first cooling medium line 108A connects on the inflow side the cooling unit 102 and a first heat exchanger 110A which is arranged in a first charging device 104A. A second cooling medium line 108B connects on the inflow side the cooling unit 102 and a second heat exchanger 110B which is arranged in a second charging device 104B. A common feed line section 108 connects here the first cooling medium line 108A and the second cooling medium line 108B to the cooling unit 102.

A first power electronics apparatus 106A for the first charging device 104A and a second power electronics apparatus 106B for the second charging device 104B are illustrated in FIG. 1. They can be arranged in a common housing.

A third cooling medium line 112A connects a first return line of the first heat exchanger 110A to a first inflow of a third heat exchanger 114A which is arranged in the first power electronics apparatus 106A. A fourth coding medium line 112B connects a second return line of the second heat exchanger 104B to a second inflow of a fourth heat exchanger 114B which is arranged in the second power electronics apparatus 106B.

In the example, the third cooling medium line 112A and the fourth cooling medium line 112B lead into one another and connect the first inflow to the second inflow in a common cooling medium line section 112.

A fifth cooling medium line 116 connects on the return flow side the third heat exchanger 114A and the fourth heat exchanger 114B to the cooling unit 102. The cooling medium is conducted from the cooling unit 102 to the first heat exchanger 110A and to the second heat exchanger 110B. The cooling medium is conducted from the first heat exchanger 110A and from the second heat exchanger 110E to the third heat exchanger 114A and to the fourth heat exchanger 114B. The cooling medium is conducted from the third heat exchanger 114A to the cooling apparatus 102. The cooling medium is conducted to the cooling apparatus 102 from the fourth heat exchanger 114B.

Figure 2:
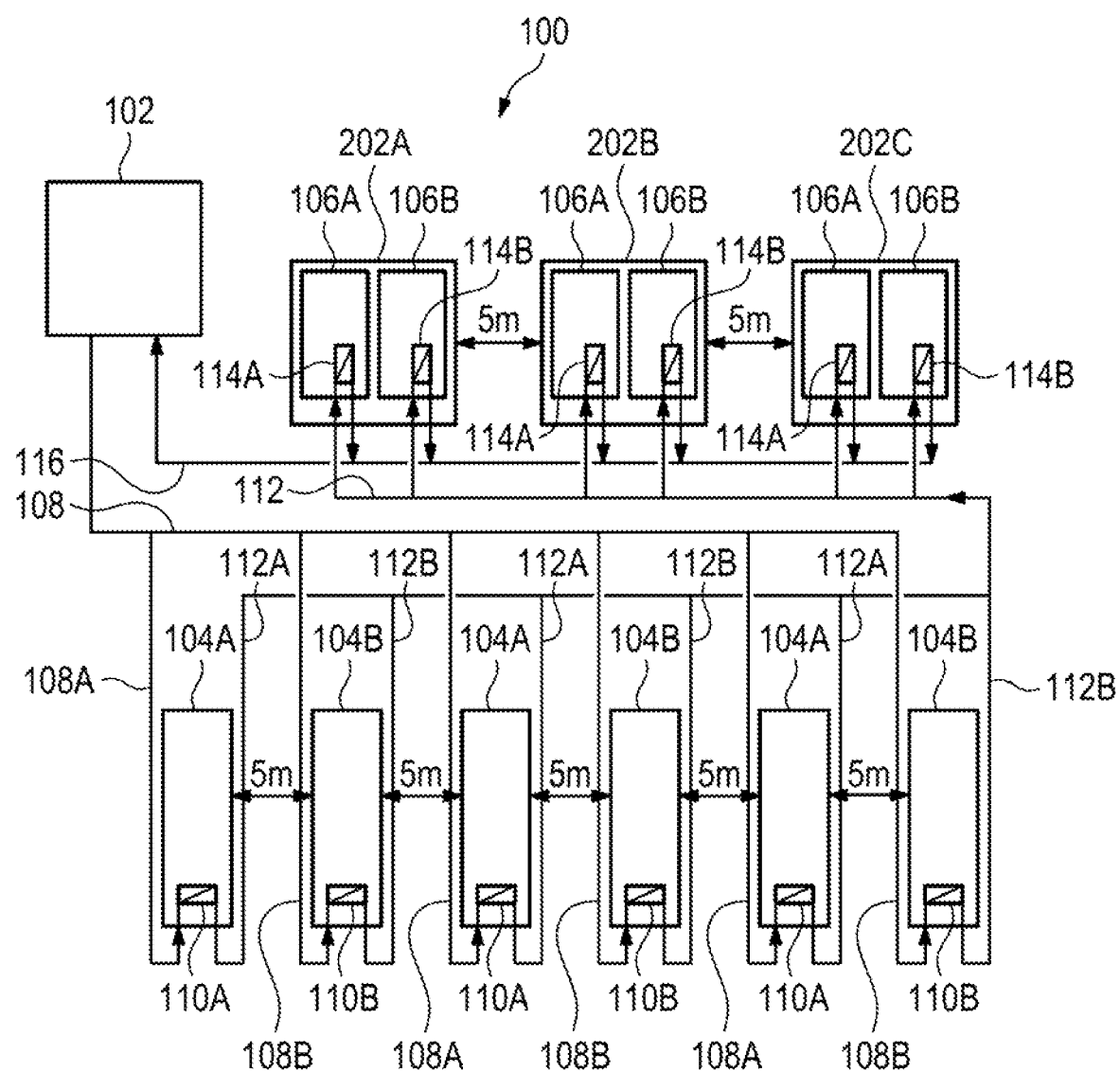
FIG. 2 shows schematically a first embodiment of the cooling system for more than two charging pillars.

FIG. 2 shows schematically a first embodiment of the cooling system.

Elements which have already been described smith respect to FIG. 1 and which have the same or a similar function are denoted in FIG. 2 by the same reference symbol as in FIG. 1.

The first power electronics apparatus 106A and the second power electronics apparatus 106B are arranged in a housing 202A. The routing of the cooling medium corresponds here to the routing which has already been described with respect to FIG. 1. A plurality of housings 202A, . . . , 202C, in which a plurality of pairs of the first power electronics apparatus 106A and the second power electronics apparatus 106B are arranged, are preferably provided. Each of the first power electronics apparatuses 106A is connected to a first charging device 104A as described above. Each of the second power electronics apparatuses 106B is connected to a second charging device 104B as described above.

The common feed line section 108 connects here the first cooling medium lines 108A and the second cooling medium lines 108B of all the first heat exchangers 110A and of all the second heat exchangers 110B to the cooling apparatus 102.

The common cooling medium line section 112 connects here the inflows of all the third heat exchangers 114A and of all the fourth heat exchangers 114B.

The cooling unit 102 is arranged in the example at a distance of at maximum 19 meters from each of the at least two charging devices 110A, 100B.

Adjacent housings 202A, . . . , 202C are arranged, for example, at a distance of 3 meters to 7 meters, preferably 5 meters from one another.

A quick-release coupling for connecting n cooling medium feed line 108 can be arranged on the cooling unit 102.

Figure 3:
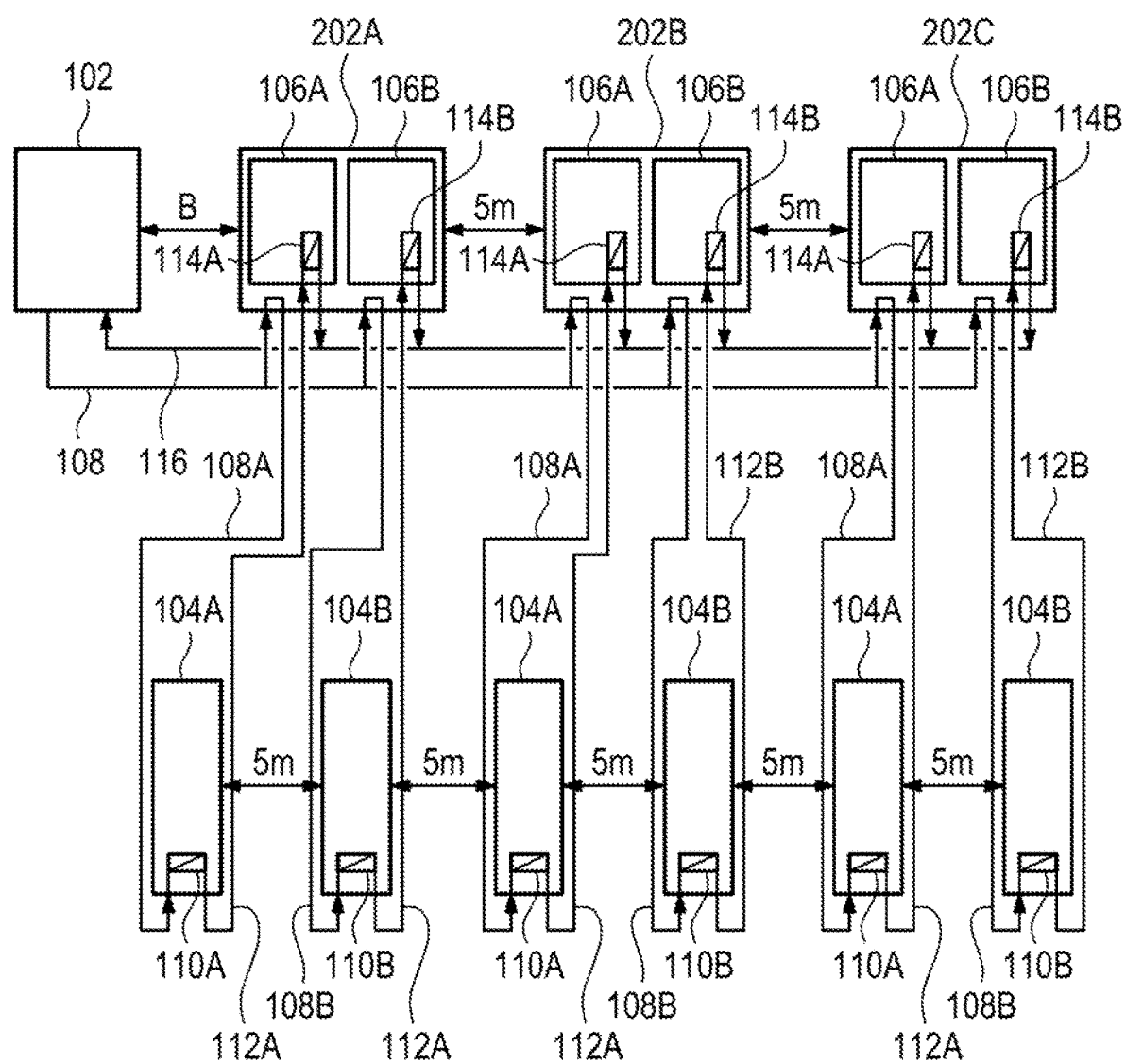
FIG. 3 shows schematically a second embodiment of the cooling system for more than two charging pillars.

FIG. 3 shows schematically a second embodiment of the cooling system in which the housings 202A, 202C described above are arranged as described above.

In the second embodiment, the cooling medium of each of the first charging devices 104A is fed directly via the first cooling medium line 108A from the first power electronics apparatus 106A which supplies this first charging device 104A with power. In the second embodiment, the cooling medium is fed back from each of the first charging devices 104A via the third cooling medium line 112A to the first power electronics apparatus 106A which supplies this first charging device 104A with power. In the second embodiment, the cooling medium of each of the second charging devices 104B is fed directly via the second cooling medium line 108B from the second power electronics apparatus 106B which supplies this second charging device 104B with power. In the second embodiment, the cooling medium of each of the second charging devices 104B is fed back via the fourth cooling medium line 112B to the second power electronics apparatus 106B which supplies this first charging device 104B with power.

The common cooling medium line section 108 connects here the cooling apparatus 102 to feed line connections on each of the housings 202A, . . . , 202C. The first cooling medium line 108A and the second cooling medium line 108B can preferably be connected to the common cooling medium feed line 108 on the housing. For example in each case a connection for the cooling unit 102, two connections for the first and direct cooling medium line 108A, 108B and two connections for the first and second direct cooling medium lines 112A, 112B are provided on the housings 202A, . . . , 202C.

A distance between each housing 202A, . . . , 202C and the charging device 104A, 104B which is connected to this housing 202A, . . . , 202C is, for example, greater than 300 meters. Adjacent housings 202A, . . . , 202C can alternatively to this be arranged at a distance of 20 to 30 meters, preferably 25 meters from one another. The distance between each housing 202A, . . . , 202C and the charging device 104A, 104B which is connected to this housing 202A, . . . , 202C is then 7 to 13 meters, preferably 10 meters.

In both embodiments, the cooling unit 102, the cooling medium lines 108A, 108B, 116 and the heat exchangers 110A, 110B, 114A, 114B are designed to make available a throughflow rate of the cooling medium of 100 liters per minute given a maximum pressure loss of 4 bar in the device.

A method for cooling provides that a cooling unit 102 makes available a cooling medium, wherein the cooling unit 102 cools at least two electric charging devices 104A, 104B and at least two power electronics apparatuses 106A, 106B which are designed to electrically charge electric vehicles.

The method preferably provides for the plurality of charging devices and power electronics apparatuses of the first embodiment or the second embodiment to be cooled.

What is claimed is:

1. A device for electrically charging electric vehicles, the device comprising:
    at least two electric charging devices each being a charging pillar that is removably connectable to a vehicle for charging the vehicle;
    at least two power supplies that are each configured to supply current to a respective one of the at least two electric charging devices; and
    a cooler configured to supply a cooling medium, wherein the cooler is configured to cool, with the cooling medium, the at least two electric charging devices and the at least two power supplies,
    wherein each power supply has a heat exchanger arranged within the respective power supply for cooling temperature-controlled power electronics disposed within the respective power supply,
    wherein each electric charging device has a heat exchanger arranged within the respective electric charging device for cooling temperature-controlled power electronics disposed within the respective electric charging device, and
    wherein the cooler is configured to circulate the cooling medium through one or more cooling medium lines that fluidly connect to the heat exchangers of the power supplies and the electric charging devices.

2. The device as claimed in claim 1,
    wherein the one or more cooling medium lines includes a first cooling medium line to connect, on an inflow side, the cooler and a first of at least two of the heat exchangers in a first of the at least two charging devices, and
    wherein the one or more cooling medium lines includes a second cooling medium line to connect the cooler and a second of the at least two heat exchangers in a second of the at least two charging devices.

3. The device as claimed in claim 2, wherein a first of the at least two power supplies for the first charging device and a second of the at least two power supplies for the second charging device are arranged in a first housing.

4. The device as claimed in claim 2,
    wherein the one or more cooling medium lines includes a third cooling medium line to connect a first return line of the first heat exchanger to a first inflow of a third heat exchanger in the first power supply, and
    wherein the one or more cooling medium lines includes a fourth cooling medium line to connect a second return line of the second heat exchanger to a second inflow of a fourth heat exchanger in the second power supply.

5. The device as claimed in claim 4,
    wherein the one or more cooling medium lines includes a fifth cooling medium line to connect a return flow side of the third heat exchanger and the fourth heat exchanger to the cooler.

6. The device as claimed in claim 4, wherein the third cooling medium line and the fourth cooling medium line lead into each other and connect the first inflow to the second inflow.

7. The device as claimed in claim 4, wherein the first cooling medium line and the second cooling medium line lead into a common cooling medium feed line that is connected to the cooler.

8. The device as claimed in claim 7, wherein the first cooling medium line and the second cooling medium line are connected to the common cooling medium feed line.

9. The device as claimed in claim 1, wherein the cooler is arranged at a distance of at maximum 19 meters from each of the at least two charging devices.

10. The device as claimed in claim 1, wherein a plurality of power supplies of the at least two power supplies are arranged in pairs in a plurality of respective housings, wherein adjacent housings are arranged at a first distance of 3 meters to 7 meters from one another, wherein a second distance between each of the charging devices and the cooler is at maximum 19 meters.

11. The device of claim 10, wherein the first distance is 5 meters.

12. The device as claimed in claim 1, wherein a plurality of power supplies of the at least two power supplies are arranged in pairs in a plurality of respective housings, wherein one of the following conditions is met: (i) adjacent housings are arranged at a first distance of 3 meters to 7 meters from one another, a wherein a second distance between each housing and the charging device which is connected to this housing is greater than 300 meters, or (ii) adjacent housings are arranged at a third distance of 20 to 30 meters from one another, wherein a fourth distance between each housing and the charging device which is connected to this housing is 7 meters to 13 meters.

13. The device as claimed in claim 12, wherein the first distance is 5 meters, the third distance is 25 meters, and the fourth distance is 10 meters.

14. A method for cooling a device for electrically charging electric vehicles, said method comprising:
    supplying power from at least two power supplies to a respective one of at least two electric charging devices, wherein each electric charging device is a charging pillar that is removably connectable to a vehicle for charging the vehicle, and each electric charging device includes temperature-controlled power electronics and a heat exchanger that are arranged within the charging pillar, and each power supply includes temperature-controlled power electronics and a heat exchanger that are arranged within the power supply; and
    cooling, with a cooling medium from a cooler the temperature-controlled power electronics of the at least two electric charging devices and the temperature-controlled power electronics of the at least two power supplies by circulating the cooling medium through one or more cooling medium lines that fluidly connect to the heat exchangers of the power supplies and the electric charging devices.

15. The method of claim 14 further comprising delivering the cooling medium through:
   a first cooling medium line of the one or more cooling medium lines that connects, on an inflow side, the cooler and a first of at least two of the heat exchangers in a first of the at least two charging devices, and
   a second cooling medium line of the one or more cooling medium lines that connects the cooler and a second of the at least two heat exchangers in a second of the at least two charging devices.

16. The method of claim 15, further comprising delivering the cooling medium through:
   a third cooling medium line of the one or more cooling medium lines that connects a first return line of the first heat exchanger to a first inflow of a third heat exchanger in the first power supply, and
   a fourth cooling medium line of the one or more cooling medium lines that connects a second return line of the second heat exchanger to a second inflow of a fourth heat exchanger in the second power supply.

17. The method of claim 16, further comprising delivering the cooling medium through a fifth cooling medium line of the one or more cooling medium lines that connects a return flow side of the third heat exchanger and the fourth heat exchanger to the cooler.

* * * * *